United States Patent [19]

Ueda et al.

[11] Patent Number: 4,549,259
[45] Date of Patent: Oct. 22, 1985

[54] GATE CONTROL CIRCUIT FOR CURRENT-TYPE INVERTER APPARATUS

[75] Inventors: Shigeta Ueda, Hitachi; Mitsuyuki Hombu, Katsuta; Yasuo Matsuda, Hitachi, all of Japan

[73] Assignee: Hitachi, Ltd., Tokyo, Japan

[21] Appl. No.: 504,436

[22] Filed: Jun. 15, 1983

[30] Foreign Application Priority Data

Jun. 18, 1982 [JP] Japan ................................ 57-103859

[51] Int. Cl.$^4$ ........................................ H02M 7/515
[52] U.S. Cl. .................................... 363/137; 363/35; 363/58
[58] Field of Search ..................... 363/35, 37, 51, 57, 363/58, 137, 138; 307/252 C, 252 P

[56] References Cited

U.S. PATENT DOCUMENTS 4,212,056  7/1980  Kitamura et al. .................. 363/138

Primary Examiner—Peter S. Wong
Assistant Examiner—Anita M. Ault
Attorney, Agent, or Firm—Antonelli, Terry & Wands

[57] ABSTRACT

A gate control circuit for current-type inverter apparatus having an inverter formed of self-extinction devices connected in a bridge form, comprises a logic circuit, pulse stretchers and gate amplifiers. When a frequency command signal is applied to the logic circuit, the logic circuit generates pulse signals for turning on or off the self-extinction devices, and the pulse signals are delayed for predetermined time in their trailing edges in response to the leading edges of the signals by the pulse stretchers so as to be extended, are amplified by the gate amplifiers, and then are supplied to the gates of the self-extinction devices.

2 Claims, 7 Drawing Figures

FREQUENCY CONTROL SIGNAL

GATE CONTROL CIRCUIT FOR CURRENT-TYPE INVERTER APPARATUS

BACKGROUND OF THE INVENTION

This invention relates to a gate control circuit for current-type inverter apparatus formed of self-extinction devices connected in a bridge form.

A current-type inverter apparatus is known which, as shown in FIG. 1 is formed of gate turn-off thyristors (hereinafter, referred to as GTO) as self-extinction devices. This inverter apparatus is used to control the revolution speed of, for example, an induction motor as a load. Since the circuit construction of this inverter apparatus is well known, the operation thereof will be briefly described. An AC current from an AC power supply 1 is rectified by a converter 2 into a DC current, which is supplied through a reactor 3 to an inverter 4. The inverter 4 is of three-phase bridge configuration each arm of which is formed of a GTO, 41 to 46 and diode, D1 to D6, connected in series, respectively. The inverter 4 converts the DC current to a three-phase AC current and supplies it to a load 5. Phase advancing capacitors 6 are each connected in parallel between the phases of the load 5. A conventional gate control circuit 9 for controlling this inverter apparatus comprises a logic circuit 7 and a gate amplifier 8 and controls the frequency of the inverter corresponding to the speed of the load 5, for example, an induction motor. A voltage signal, or frequency command signal corresponding to the inverter frequency is applied to the logic circuit which produces gate signals for turning on or off each self-extinction device, and the gate signals are amplified by the gate amplifier and supplied to the gates.

The operation of the conventional gate control circuit at the time when current flow is commutated from GTO 41 into GTO 42 will be described with reference to FIGS. 1 and 2.

When a frequency command signal is applied to the logic circuit 7, the logic circuit 7 produces a group of pulses of frequency corresponding to the input voltage thereto and the pulse is divided by a frequency divider (not shown) at, for example, 120°-phase angle, so that six rectangular pulses with their phases being shifted by 60° are produced. These 6 pulses are applied through a waveform shaping circuit (not shown) to the gate amplifier 8 where they are amplified, and the amplified signals are applied to the gates of the GTOs of the inverter 4. The waveforms of the output signals from the logic circuit 7 are ideally shown in FIG. 2. In this case, the GTO 41 is turned off and at the same time the GTO 42 is turned on, thus current flow being smoothly commutated from GTO 41 into GTO 42. In practice, however, when as shown in FIG. 3a, the output $P_{41}$ from the logic circuit 7 for turning off the GTO 41 at time $T_0$ is changed from high level to low level, the output $P_{42}$ from the logic circuit 7 for turning on the GTO 42 will be delayed for the time $T_L$ to change from low level to high level as shown in FIG. 3a. The delay time $T_L$ is due to the operation delay characteristic of the logic elements, for example, TTL and caused when a plurality of different-mode logic output signals are produced from one frequency command signal.

Similarly, in the gate amplifier 8, signals are delayed in their transmission, that is, the output signals P41 and P42 from the logic circuit 7 are delayed $T_{G1}$ and $T_{G2}$ by the gate amplifier 8 as shown in FIG. 3b and then supplied as gate control signals P41' and P42' to the gates of the GTOs 41 and 42 respectively. The GTOs 41 and 42 delay the gate control signals by $T_{OFF}$ or $T_{ON}$ when they are turned off or on, respectively as shown in FIG. 3c. That is, at time $T_0$ the output signal P41 from the logic circuit 7 is reduced to a low level and then when in practice the GTO 41 is turned off at time $T_1$ and GTO 42 turned on at time $T_2$, with the relation $$T_1 = T_0 + T_{G1} + T_{OFF} \leq T_0 + T_L + T_{G2} + T_{ON} = T_2 \qquad (1)$$

both the GTOs 41 and 42 under commutating operation may be turned off in the shaded period in FIG. 3. During this period, the energy stored in the DC reactor 3 is discharged through a capacitor snubber circuit not shown, not through an arm main circuit. This snubber circuit is provided in parallel to each GTO in order to absorb the surge voltage generated between the anode and cathode of the GTO when the GTO is turned off. However, the capacitor of the snubber circuit is usually too small in capacity to absorb the discharge energy from the DC reactor 3. Thus, the capacitor of the snubber circuit is overcharged so that the voltage between the anode and cathode of the GTO exceeds an allowable voltage and breaks down the GTO.

To obviate the drawbacks of this conventional example, there was proposed a gate control circuit having a signal delay-and-shape circuit provided between the logic circuit and gate amplifier to delay the trailing edge of pulse by a predetermined time as is disclosed in Japanese Patent Publication No. 19665/82 published on Apr. 23, 1982 filed by Kitamura and assigned to TOKYO SHIBAURA DENKI INC.

In this gate control circuit, as shown in FIG. 4, pulse B is produced for each-phase self-extinction device in synchronism with the trailing edge of the gate pulse A, and the logical sum C of pulse B and pulse A is obtained, then the trailing edge of the gate pulse being delayed so that the two-self extinction devices under commutating operation are turned on together during a period of time and thereby prevented from turning off together. In this case, however, since the elements forming the signal delay-and-shape circuit are turned on and off at slightly irregular timings, the pulse B is risen with delay of just small time d in response to the leading edge of pulse A with the result that the pulse C has a thin slit, or deficient pulse is caused as shown in FIG. 4c. Thus, the self-extinction devices are supplied with on-signal at once before entering the complete off-condition and thereby may be broken down.

SUMMARY OF THE INVENTION

It is an object of this invention to provide a control circuit for current type inverter apparatus which can obviate the drawbacks of the prior art, or is capable of removing the period of time in which two self-extinction devices concerning current commutating are turned off together, thereby preventing the self-extinction devices from breaking down by overvoltage.

In other words, this invention is to prevent self-extinction devices from breaking down by delaying the turn-off signal to a device by a predetermined time and thereby removing the period in which the devices are turned off together.

In order to achieve the object of this invention, the gate control circuit according to this application has a pulse stretcher circuit formed of a delay circuit and an OR circuit, provided between the logic circuit and the gate amplifier, so that the output signal from the logic circuit and the delayed signal produced in response to the leading edge of the output signal are supplied to the OR circuit by which the logical sum of both input signals is produced thus the trailing edge of the gate signal being delayed by a predetermined period of time.

DESCRIPTION OF THE PREFERRED EMBODIMENT

One embodiment of this invention will hereinafter be described with reference to FIGS. 5 to 7.

Figure 5:
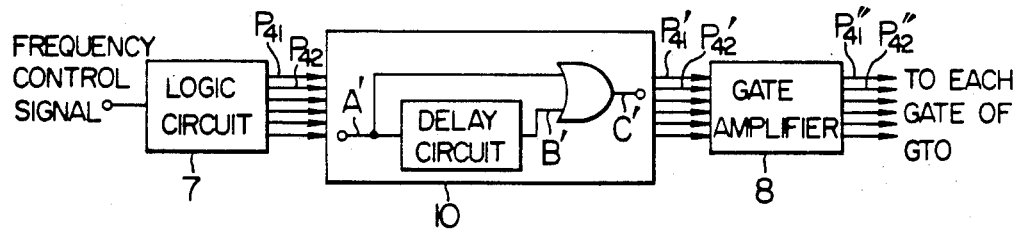
FIG. 5 is a block diagram of an embodiment of a gate control circuit of the invention.
Figure 6:
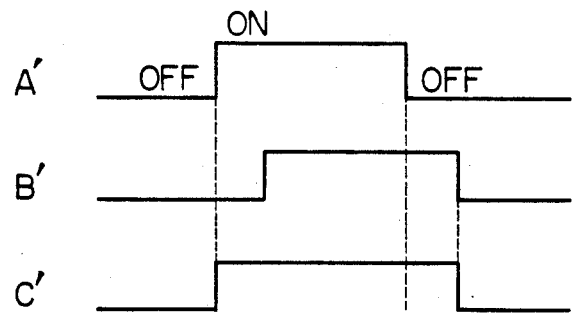
FIG. 6 is a waveform diagram of signals at each portion of the pulse stretcher in the embodiment of this invention.
Figure 7:
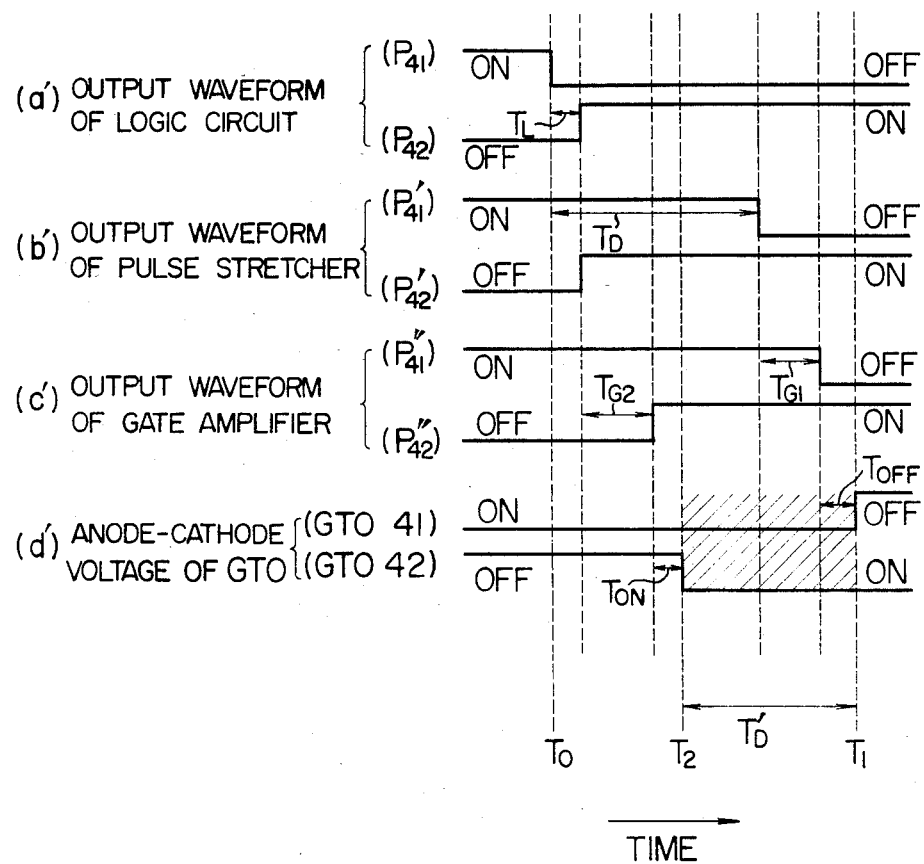
FIG. 7 is a waveform diagram of signals at each portion of the gate control circuit in the embodiment of FIG. 5.

FIG. 5 is a block diagram of a gate control circuit 11 according to this invention, and FIGS. 6 and 7 are waveform diagrams of signals at each portion.

Referring to FIG. 5, the output signals from the logic circuit 7 are applied through a pulse stretcher 10 to the gate amplifier 8. The pulse stretcher 10 has a function to extend the pulse width, that is serves to delay, for example, only the trailing edge of the input rectangular signals.

The pulse stretcher 10, as shown in FIG. 5, comprises pairs of delay circuits and OR circuits, the delay and OR circuits of each pair being used for each of the output signals from the logic circuit 7. The delay circuit can be formed of for example, a capacitor and resistor the time constant of which is determined so as to provide a predetermined delay to an input signal. The waveform of signal at each point in this pulse stretcher 10 is shown in FIG. 6. In other words, a rectangular signal from the logic circuit 7, as shown in FIG. 6 at A', is applied to the delay circuit, which then delays the input signal by a predetermined time to produce a pulse signal, shown at B' in FIG. 6, which rises a predetermined time after the input signal is applied to the delay circuit and which falls off the predetermined time after the input signal falls off. When the input signal A' from the logic circuit 7 and the signal B' from the delay circuit are applied together to the OR circuit of the same pair, the OR circuit produces an output signal as shown at C' in FIG. 6, of which the leading edge coincides that of the input signal A' and the trailing edge is delayed with no loss as in the prior art.

The operation of the gate control circuit 11 having the pulse stretcher circuit 10 will be described with reference to the waveform diagram of FIG. 7.

Figure 1:
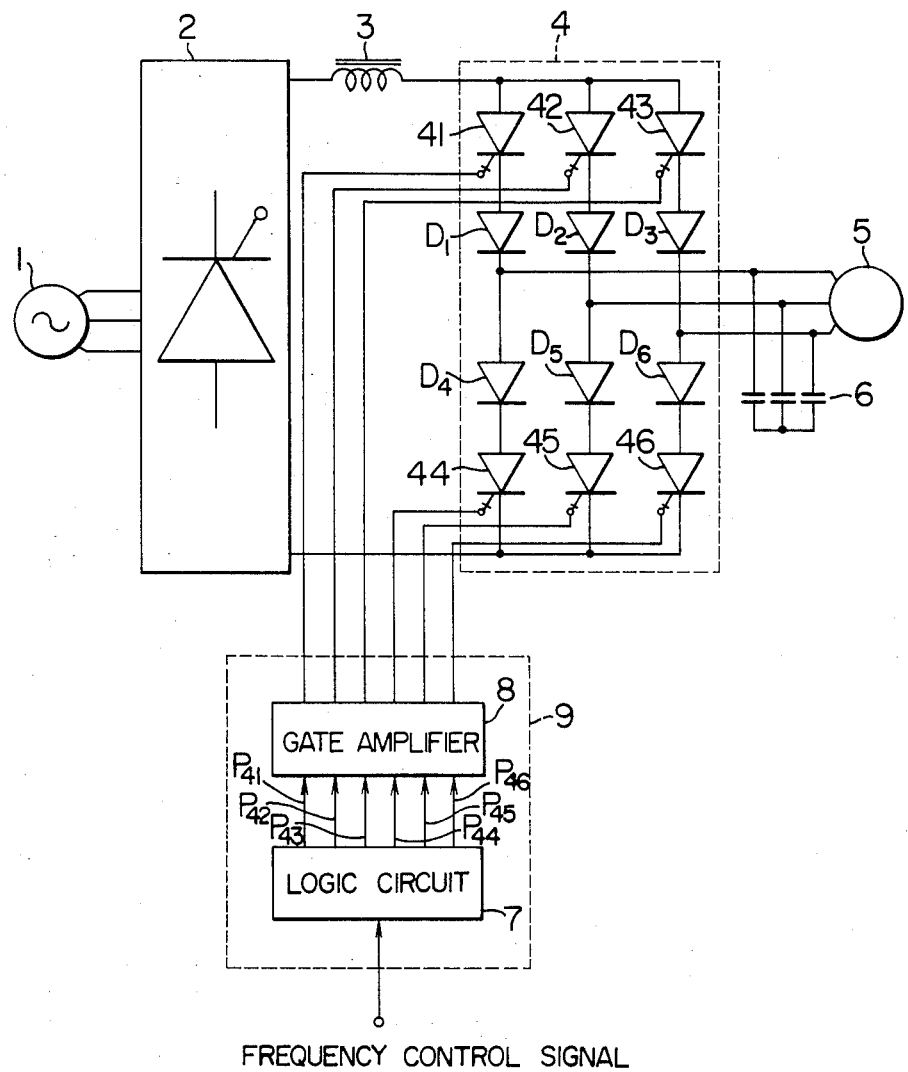
FIG. 1 is a block diagram of the combination of a conventional control circuit and a current-type inverter apparatus applicable to this invention.
Figure 2:
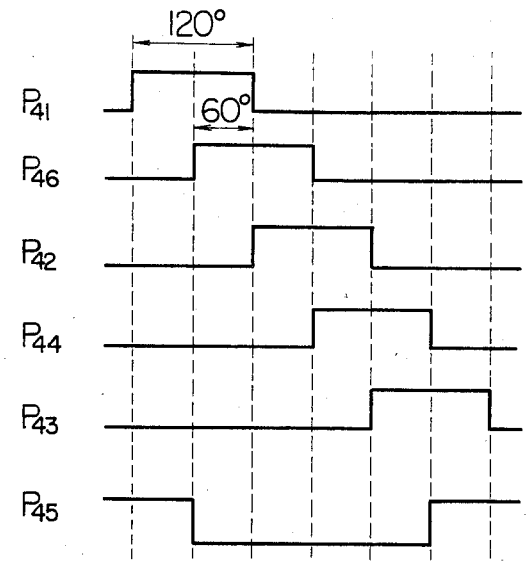
FIG. 2 is a timing chart of output signal waveforms ideal for the conventional gate control circuit of FIG. 1.
Figure 3:
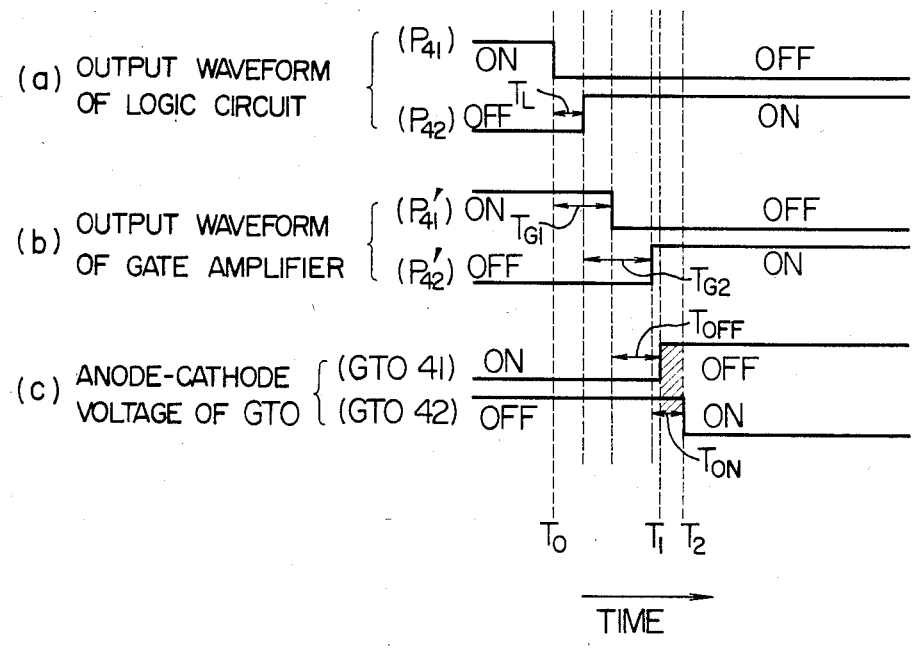
FIG. 3 is a waveform diagram of actual signals at each portion of the conventional gate control circuit, particularly noting two GTOs under current commutating operation.
Figure 4:
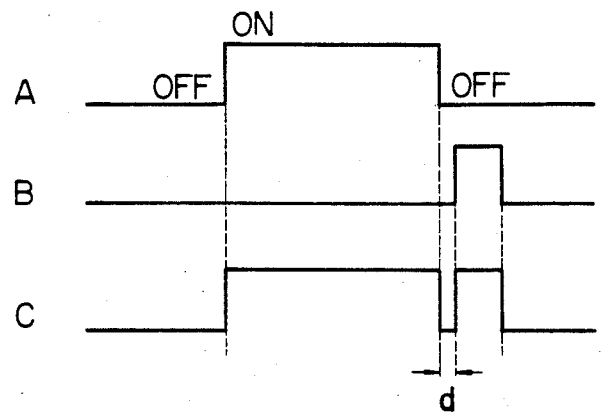
FIG. 4 is a waveform diagram of an output of another conventional gate control circuit.

FIG. 7(a') shows the waveforms of signals produced from the logic circuit 7 so that the GTOs 41 and 42 are respectively turned off and on for commutating the current from GTO 41 to GTO 42, as in (a) of FIG. 3. In this case, the signal P42 is risen up time $T_L$ after the signal P41 falls off.

It is assumed that when the signals shown as (a') in FIG. 7 are applied to the pulse stretcher 10, the pulse stretcher 10 produces output signal P41' delayed by $T_D$ from the trailing edge of the signal P41 and signal P42' the leading edge of which is coincident with that of the signal P42, as shown in (b') of FIG. 7. The time $T_D$ is selected to be a value so that $T_2$ in Eq. (1) is smaller than $T_1$. These signals P41' and P42' are amplified by the gate amplifier 8 and as a result the gate amplifier 8 produces output signals P41'' and P42'' into which the input signals P41' and P42' are delayed $T_{G1}$ and $T_{G2}$ as shown in (c') of FIG. 7. Thus, the GTOs 41 and 42 are controlled by the gate signals so that as shown in (d') of FIG. 7, the GTO 41 is turned off time $T_D'$ after the GTO 42 is turned on at $T_2$. That is, since $T_D'$ is given as $$T_D' = T_1 - T_2 \\ = (T_D + T_{G1} + T_{OFF}) - (T_L + T_{G2} + T_{ON}) \quad (2)$$

the $T_D$ is determined to satisfy $T_D'>0$ and consider scattering of delay times. Accordingly, since either of the two self-extinguish switching devices GTOs 41 and 42 associated with current commutating is always turned on, the current path (AC power supply 1 - converter 2 - DC reactor 3 - GTO 41 - diode D1 - load 5 - diode D6 - GTO 46 - converter 2 - AC power supply 1) through which current flows when the GTO 41 is turned on is opened after the current path (AC power supply 1 - converter 2 - DC reactor 3 - GTO 42 - diode D2 - load 5 - diode D6 - GTO 46 - converter 2 - AC power supply 1) through which current flows when GTO 42 is turned on is closed. Therefore, the discharge current caused by the energy stored in the DC reactor is flowed in the smoothly commutated GTO main circuit, but not in the snubber circuit. In addition, unlike the conventional example in which delayed pulses are produced in accordance with the trailing edge of the output signal from the logic circuit and added to the output signal to extend pulses, the gate signals whose trailing edges are delayed are not deficient pulses and safely make commutating of GTOs.

According to this embodiment, as described above, the gate signals with the trailing edges delayed and with no deficit of pulse are applied to the GTOs to prevent the GTOs for current commutating from turning off together at the same time, and therefore the GTOs can be protected from breakdown by overvoltage and imperfect gate signals.

While the gate control circuit of this invention is used in the inverter formed of GTOs for self-extinction devices as in this embodiment, it may be used to control the inverter formed of other self-extinction devices such as power transistors or FETs.

We claim:
1. A gate control circuit for current-type inverter apparatus having an inverter formed of self-extinction devices connected in a bridge form, comprising:
  a logic circuit for generating pulse signals to turn on and off said self-extinction devices at a predetermined timing in response to a frequency command signal;
  pulse stretcher means for extending the width of said pulse signals of said logic circuit in response to the leading edges of said pulse signals for turning-on said self-extinction devices so as to prevent an operation mode of said inverter wherein said self-extinction devices in a current commutating operation are turned-off simultaneously; and gate amplifiers for amplifying the output signals from said pulse stretcher means and supplying the amplified signals to said self-extinction devices.

2. A gate control circuit according to claim 1, wherein said pulse stretcher means includes a plurality of pulse stretchers, each of said pulse stretchers comprises a delay circuit and an OR circuit, and each of said OR circuits is supplied with said pulse signal of said logic circuit and another pulse signal delayed for a predetermined time by said delay circuit in response to the leading edge of said pulse signal of said logic circuit.

* * * * *